(12) United States Patent
Regensburger

(10) Patent No.: US 8,089,058 B2
(45) Date of Patent: Jan. 3, 2012

(54) METHOD FOR ESTABLISHING A WAFER TESTING RECIPE

(75) Inventor: Menachem Regensburger, Shimshit (IL)

(73) Assignee: Camtek Ltd., Migdal-Haemek (IL)

( * ) Notice: Subject to any disclaimer, the term of this patent is extended or adjusted under 35 U.S.C. 154(b) by 284 days.

(21) Appl. No.: 12/064,367

(22) PCT Filed: Aug. 30, 2006

(86) PCT No.: PCT/IL2006/001007
§ 371 (c)(1),
(2), (4) Date: Dec. 31, 2008

(87) PCT Pub. No.: WO2007/026361
PCT Pub. Date: Mar. 8, 2007

(65) Prior Publication Data
US 2009/0290782 A1    Nov. 26, 2009

(30) Foreign Application Priority Data
Sep. 1, 2005   (IL) .......................................... 170610

(51) Int. Cl.
*G01N 21/86*    (2006.01)

(52) U.S. Cl. .................. 250/559.4; 250/559.45
(58) Field of Classification Search ............... 250/559.4, 250/559.34, 559.44, 559.45, 208.1; 382/145–147, 382/133; 356/237.2–237.5, 239.7, 239.8
See application file for complete search history.

(56) References Cited

U.S. PATENT DOCUMENTS 7,200,258 B2 *   4/2007   Lee et al. ...................... 382/145
* cited by examiner

*Primary Examiner* — Que T Le
(74) *Attorney, Agent, or Firm* — Reches Patents

(57) ABSTRACT

A method and a system for establishing a wafer testing recipe are disclosed. The method may include acquiring images of a number of dice from a produced wafer; using at least part of the images to compose a reference-image; defining on the reference-image multiple "zones of interest; determining the Detection-Policy for each kind of zone of interest and determining the algorithm that will be used by each of the Detection-Policy; determining the parameters of each of the Detection-Policy's algorithms; determining the Reporting-policy; determining the Inspection-policy; and creating a "wafer testing recipe" by integrating of the testing reference of a typical die image, the zones of interest, the Detection-Policies, the parameters of the Detection-Policies' algorithms, the Reporting-Policies and the Inspection-Policies.

6 Claims, 2 Drawing Sheets

METHOD FOR ESTABLISHING A WAFER TESTING RECIPE

FIELD OF THE INVENTION

The present invention relates to the field of die editing for Automatic Optical Inspection (AOI). More specifically, the present invention relates to a method and a system for establishing a recipe for wafer testing, such recipes are used in the AOI systems.

BACKGROUND OF THE INVENTION

Automatic optical inspection (AOI) systems use image processing and dedicated algorithms to inspect the surfaces of a PCB or a wafer in order to recognize defects on this surface. AOI systems compare an image of each die, or each suit (which includes number of dies or part of a die), or a whole wafer with a reference image in order to recognize differences that are suspected as defects. The AOI system is designed to use algorithms and predetermined criteria, to decide and to report which different is a defect.

The AOI process is done according to a recipe. A recipe includes, inter-alia, a detection-policy, reporting-policy and a reporting-policy. The detection-policy is a definition of which algorithms to use and a definition of the parameters of each algorithm. The reporting-policy is made by defining set of specific names of defect classes for reporting during inspection of lot of wafers. The inspection-policy is a definition of the behavior of the system during inspection; this policy is built up from set of pre-defined logical rules that guide the system what to do in each specific case.

The present invention provides a method and a system for establishing a recipe for testing a specific kind of wafer. The present invention provides some advantages. The present invention enables to decrease the recipe preparation time, enables to decrease the inspection results review time and enables to increase the utilization of wafer inspection machine. Moreover, the present invention enables recipe portability. The recipe is prepared on an off-line system and then it can be copied to a plurality of wafer inspection machines, which also ensures the similarity of the inspection criteria and rules of multiple inspection sites.

SUMMARY OF THE INVENTION

The present invention is a method and a system for establishing a recipe for a wafer, a site or a die inspection.

According to the teachings of the present invention there is provided a method for recipe establishment comprised of the following steps:

acquiring images of a number of dies from a produced wafer;

using at least part of the images to compose a reference-image to be used as testing reference of a typical die image;

defining on the reference-image single and/or repeatable elements of a die pattern as a "zone of interest;

determining the Detection-Policy for each of the zone of interest or for a group of similar zones of interest and determining the algorithm that will be used by each of the Detection-Policy;

determining the parameters of each of the Detection-Policy's algorithms;

determining the Reporting-policy by defining a set of specific names of defect classes that could be used during inspection of a specific lot of wafers;

determining the Inspection-policy defining behavior of inspection system as a set of pre-defined logical rules; and establishing a "wafer testing recipe" by integrating of the testing reference of a typical die image, the defined zones of interest, the determined Detection-Policies, the parameters of the determined Detection-Policies' algorithms, the determined Reporting-Policies and the determined Inspection-Policies.

According to another application, the method is provided wherein the definition of the "zone of interest" is done manually by an operator, automatically by a dedicated software, by importing defined zone from other source or by a combination of these techniques.

According to another application, the method further includes the usage of well-known software and tools for image processing and graphical editors for manual definition technique of "zones of interest".

According to another application, the method further includes the usage of dedicated algorithms that are using dedicated techniques—such as finding similar patterns that both color or grayscale matches a defined criteria or finding other similar patterns that both pattern or shape matches a defined example—for the automatic definition technique of "zones of interest".

According to another application, the method further includes the usage of importing a pre-defined geometrical figure as a zone of interest from other source.

According to another aspect of the present invention it is provided a system for establishing a wafer testing recipe comprising:

a camera for acquiring images of a number of dies from a produced wafer; and a dedicated software that operative for:

using at least part of the images and composes a reference-image to be used as testing reference of a typical die image;

defining on said reference-image single and/or repeatable elements of a die pattern as a "zone of interest;

determining the Detection-Policy for each of the zone of interest or for a group of similar zones of interest and determining the algorithm that will be used by each of the Detection-Policy;

determining the parameters of each of the Detection-Policy's algorithms;

determining the Reporting-policy by defining a set of specific names of defect classes that could be used during inspection of a specific lot of wafers;

determining the Inspection-policy defining behavior of inspection system as a set of pre-defined logical rules; and creating a "wafer testing recipe" by integrating of the testing reference of a typical die image, the defined zones of interest, the determined Detection-Policies, the parameters of the determined Detection-Policies' algorithms, the determined Reporting-Policies and the determined Inspection-Policies.

According to a preferred embodiment of the present invention, the system further includes the capability to define the "zone of interest"—manually by an operator, automatically by dedicated software, by importing defined zone from other source or by a combination of these techniques.

According to another preferred embodiment of the present invention, the system further includes a display on which an operator can manually define "zones of interest" by using well-known software and tools for image processing and graphical editors.

According to another preferred embodiment of the present invention, the system further includes the capability to use dedicated algorithms that are using dedicated techniques—such as finding similar patterns that both color or grayscale matches a defined criteria or finding other similar patterns that both pattern or shape matches a defined example—for said automatic definition technique of "zones of interest".

According to another preferred embodiment of the present invention, the system further includes the capability of importing a pre-defined geometrical figure as a zone of interest from other source.

According to yet another preferred embodiment the present invention is provided wherein the system enables fine-tuning of the recipe's components by inspecting—using off-inspection machine—other images taken from the produced wafer and enables operator to manually overwrite parameters or decision that where taken by the system automatically.

According to yet another preferred embodiment the present invention is provided wherein the system enables to define the priority of a pixel in a case that the pixel is belong to a number of "zones of interest".

BRIEF DESCRIPTION OF THE FIGURES

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the figures.

DESCRIPTION OF THE PREFERRED EMBODIMENTS

Figure 1A:
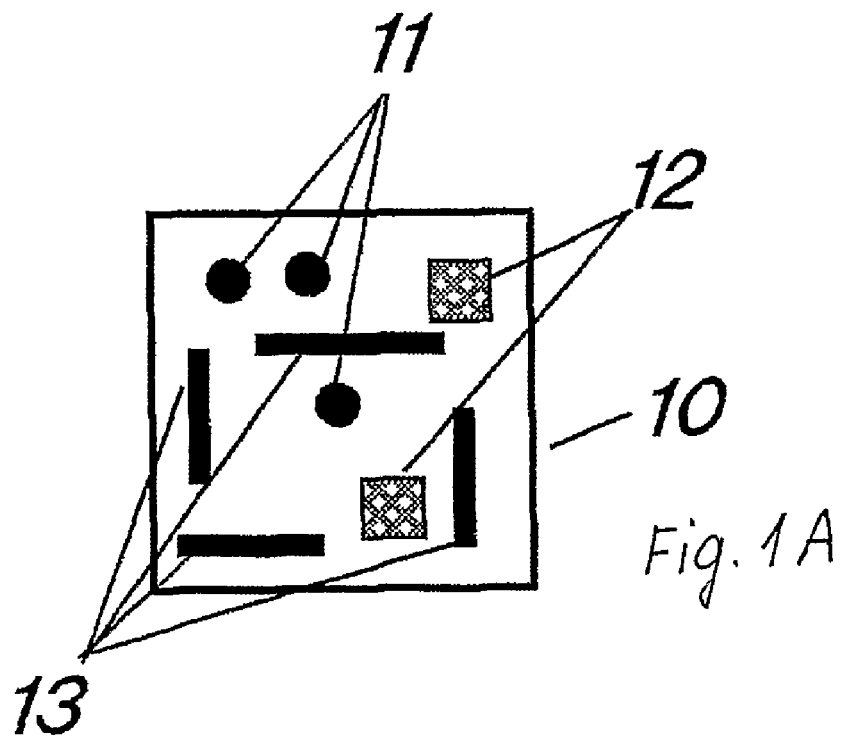
FIGS. 1A and 1B illustrate the way of editing a die into zones of interest.

The present invention is a method and a system for establishment of recipe for inspection or a die, a site or a whole wafer.

According to the present invention, a plurality of dies images from a produced wafer is acquired. Part of these images are used for composing a typical die image and the others are used for off-line fine-tuning of the recipe. The typical die image is called "reference die's image".

On the reference die's image zones of interest are defined, some of these zones are similar. For each different zone of interest or for a group of similar zones of interest a detection-policy, a reporting-policy and an inspection-policy are defined. The detection-policy is a definition of which algorithms to use and a definition of the parameters of each algorithm. The reporting-policy is made by defining set of specific names of defect classes for reporting during inspection of lot of wafers. The inspection-policy is a definition of the behavior of the system during inspection; this policy is built up from set of pre-defined logical rules that guide the system what to do in each specific case.

Defining the zones of interest can be done manually, automatically or by importing an image or part of image that is defined in another place. An operator that defines zone of interest by using well-known software and tools for image processing and graphical editors can do the definition manually. By using dedicated algorithms that are using dedicated techniques—such as finding similar patterns that both color or grayscale matches a defined criteria or finding other similar patterns that both pattern or shape matches a defined example, automatic definition can be done.

Now the recipe can build up from the whole components: the reference die image, the zones of interest or group of similar zones, the detection policy with the algorithms' parameters, the reporting policy and the inspection policy.

The build up recipe can be fine-tuned by running it on the other part of images that was acquired from the produced wafer and the operator can overwrite the parameters and/or decisions that was taken by the system automatically.

The principles and operation of the method and the system according to the present invention may be better understood with reference to the drawing and the accompanying description.

Figure 1B:
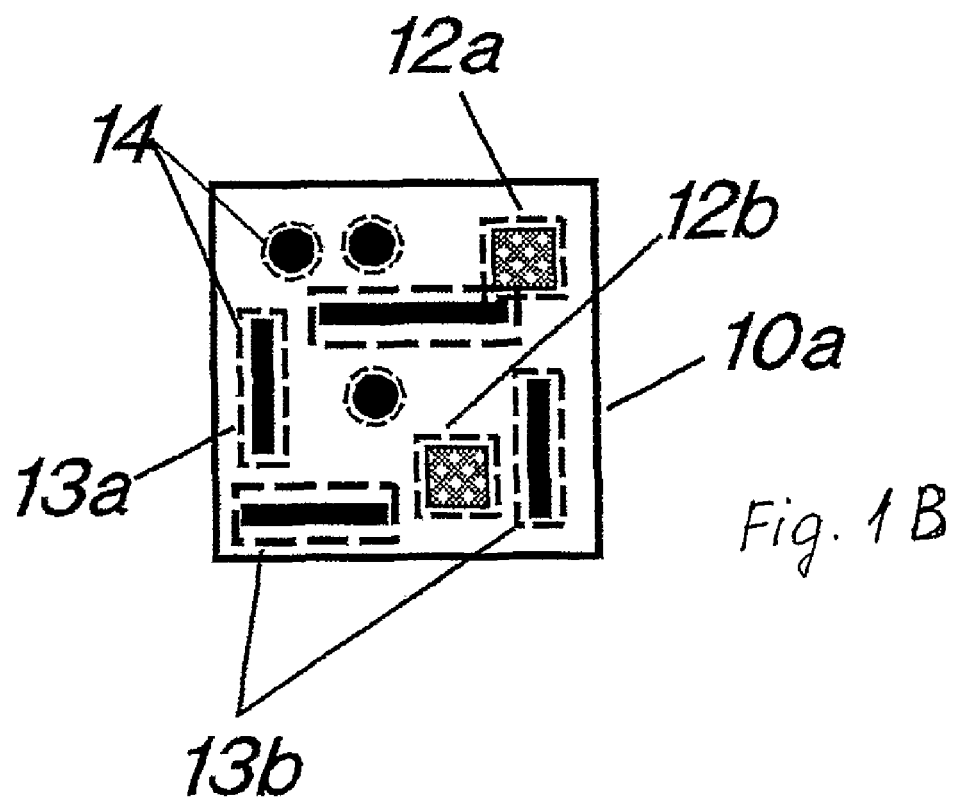

Referring now to the drawing, FIG. 1 illustrates the way of editing a die into zones of interest. From a plurality of images of dies acquired from a produced wafer, a typical die image—FIG. 1B—is composed. This typical die image 10 includes plurality of elements with different shapes and colors or grayscale.

Some of these elements are circle shaped 11, some are square shaped 12 or line shaped 13. The zones of interest can be defined manually—one by one—or by defining typical zones and letting the system to find similar zones, wherein the common denominator can be predetermined according the shape, grayscale or any other parameter.

FIG. 1B shows the typical die image 10a wherein the zones of interest 14 are defined. The square shaped element 12a was defined manually and the system finds another element 12b with the same predetermined parameters—shape or grayscale. In the same way the line shaped element 13a was defined and the system defines the other similar elements 13b.

Figure 2:
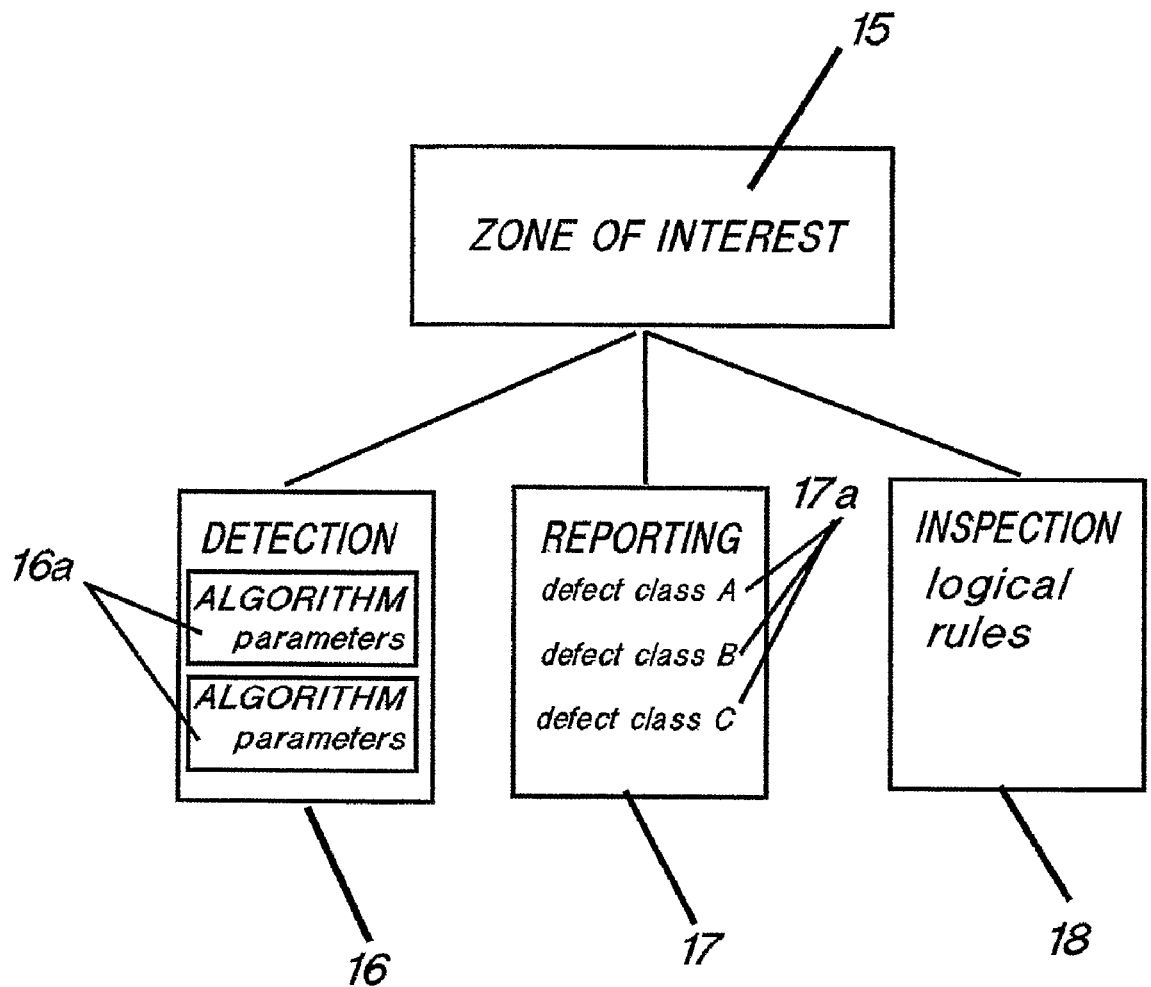
FIG. 2 illustrates a typical recipe's components in ascription to a zone of interest.

FIG. 2 illustrates a typical recipe's components in ascription to a zone of interest. The recipe includes sub-recipes for each kind of zone of interest 15. This sub-recipe includes at least three main elements—a detection-policy 16, a reporting-policy 17 and an inspection-policy 18. The detection-policy 16 includes the algorithms 16a that will be used while detecting this zone and for each algorithm parameters are defined. The reporting-policy 17 includes asset of specific names 17a of defect classes and the inspection-policy 18 includes logical rules that defines the behavior of the inspection system e.g., incase of "a" do "b".

Although the invention has been described in conjunction with specific embodiments thereof, it is evident that many alternatives, modifications and variations will be apparent to those skilled in the art, accordingly, it is intended to embrace all such alternatives, modifications and variations that fall within the spirit and broad scope of the appended claims.

What is claimed is:

1. A method for establishing a wafer testing recipe comprising:

acquiring, by an automatic optical inspection (AOI) system, images of a number of dies from a produced wafer;

using, by an off-line system, at least a part of said images to compose a reference-image to be used as testing reference of a typical die image;

defining, by the off-line system, on said reference-image elements of a die pattern that differ from each other as different kinds of zones of interest;

determining, by the off-line system, Detection-Policies that comprise a Detection-Policy for each kind of zone of interest;

determining a Detection-Policy algorithm of each Detection-Policy;

determining, by the off-line system, parameters of each of said Detection-Policy algorithm;

determining, by the off-line system, Reporting-Policies that comprise a Reporting-policy for each kind of zone of interest by defining a set of defect classes that could be used during inspection of a specific lot of wafers;

determining, by the off-line system, Inspection-Policies that comprise an Inspection-policy for each kind of zone of interest, each Inspection-policy defining a behavior of an inspection system as a set of pre-defined logical rules;

establishing, by the off-line system, a wafer testing recipe by integrating of said testing reference of a typical die image, said defined zones of interest, Detection-Policies, parameters of said each Detection-Policy algorithm, said Reporting-Policies and said Inspection-Policies; wherein the wafer testing recipe comprises a sub-recipe for each kind of area of interest; and performing, by the AOI system, an AOI process to recognize defects using the wafer testing recipe.

2. The method of claim 1, comprising receiving, by the off-line system, a definition of at least one zone of interest from a user and detecting at least one other zone of interest said definition.

3. The method of claim 1, further comprising fine tuning the wafer testing recipe by running the wafer testing recipe on another part of the images of the number of dies from the produced wafer and receiving from an operator at least one of a parameter overwrite and a decision overwrite.

4. The method of claim 1, wherein at least one kind of zone of interest comprises multiple zones of interest that are similar to each other.

5. The method of claim 1, further comprising importing a pre-defined geometrical figure as a zone of interest from other sources.

6. The method of claim 1, comprising defining a priority of a pixel in a case that said pixel belongs to a number of zones of interest.

* * * * *